United States Patent [19]

Graiver et al.

[11] Patent Number: 4,851,168

[45] Date of Patent: Jul. 25, 1989

[54] NOVEL POLYVINYL ALCOHOL COMPOSITIONS AND PRODUCTS PREPARED THEREFROM

[75] Inventors: Daniel Graiver, Midland; Robert E. Kalinowski, Auburn; Gary A. Dahlbeck, Bay City, all of Mich.

[73] Assignee: Dow Corning Corporation, Midland, Mich.

[21] Appl. No.: 290,782

[22] Filed: Dec. 28, 1988

[51] Int. Cl.$^4$ .......................... B05B 3/00; B29C 35/02
[52] U.S. Cl. ...................... 264/28; 264/210.3; 264/210.7; 264/210.8; 264/211.16; 264/211.15; 264/185; 524/173; 524/379; 524/503
[58] Field of Search ........................ 524/173, 379, 503; 264/28, 185, 210.3, 210.7, 210.8, 211.16, 211.15

[56] References Cited

U.S. PATENT DOCUMENTS

| | | | |
|---|---|---|---|
| 3,932,574 | 1/1976 | Shiraishi et al. | 264/185 |
| 4,131,581 | 12/1978 | Coker | 524/173 |
| 4,244,914 | 1/1981 | Ranalli et al. | 264/185 |
| 4,599,267 | 12/1987 | Kwon et al. | 428/364 |
| 4,603,083 | 10/1987 | Tanaka et al. | 428/364 |
| 4,612,157 | 9/1986 | Genba et al. | 264/185 |
| 4,663,358 | 5/1987 | Hyon et al. | 521/64 |
| 4,698,194 | 10/1987 | Tanaka et al. | 264/185 |
| 4,713,290 | 12/1987 | Kwon et al. | 428/364 |
| 4,765,937 | 8/1988 | Hyon et al. | 264/185 |

FOREIGN PATENT DOCUMENTS

| | | |
|---|---|---|
| 216407 | 4/1987 | European Pat. Off. . |
| 108711 | 5/1986 | Japan . |
| 108712 | 5/1986 | Japan . |

OTHER PUBLICATIONS

Text, Polyvinyl Alcohol Fibers, by Ichiro Sakurada (Marcel Decker, 1985).

*Primary Examiner*—Morton Foelak
*Attorney, Agent, or Firm*—Robert Spector

[57] ABSTRACT

Solutions of polyvinyl alcohol in non-aqueous mixtures of dimethyl sulfoxide and up to about 30 weight percent, based on said mixture, of an alcohol containing from 1 to about 4 carbon atoms can be converted to hydrogels, fibers and other useful products.

3 Claims, No Drawings

NOVEL POLYVINYL ALCOHOL COMPOSITIONS AND PRODUCTS PREPARED THEREFROM

BACKGROUND OF THE INVENTION

1. Field of the Invention

This invention relates to novel polyvinyl alcohol compositions. More particularly, this invention relates to solutions of polyvinyl alcohol in mixtures of non-aqueous solvents. Hydrogels prepared from these compositions exhibit improved properties relative to gels prepared from the aqueous or non-aqueous polyvinyl alcohol compositions of the prior art.

2. Description of the Prior Art

Gels, fibers and other products prepared from solutions of polyvinyl alcohol in water or a mixture of water and a water-miscible organic solvent such as methanol, propanol, dimethyl sulfoxide and N,N-dimethylformamide are well known from numerous patents and other publications. Typical of recently issued patents describing gels formed from aqueous solutions of polyvinyl alcohol is U.S. Pat. No. 4,663,358, which issued to Hyon et al on May 5, 1987. This patent teaches cooling to below room temperature a solution of polyvinyl alcohol in a mixture of water and a water-miscible organic solvent such as alcohols containing from 1 to 4 carbon atoms, glycol and dimethyl sulfoxide. Mixtures of water and dimethyl sulfoxide are preferred, and the water can constitute from 10 to 90 weight percent of the solvent mixture. The gel formed by cooling the solution is then immersed in flowing water to remove the organic solvent. Alternatively the initial gel is dried to remove substantially all of the solvent and then immersed in water to form the hydrogel.

Hydrogel prepared as described in the Hyon patent are transparent whereas gels formed using a solution of polyvinyl alcohol in either water or dimethyl sulfoxide as the only solvent are opaque.

Fibers formed from polyvinyl alcohol and various methods for preparing such fibers are discussed in a text by Ichiro Sakurada entitled "Polyvinyl Alcohol Fibers" (Marcel Decker, 1985). Most of the methods for preparing polyvinyl alcohol fibers that are described in this text use a solution of the polymer in either water or a mixture of water and a watermiscible organic solvent. The one notable exception was originally reported by H. M. Zwick and involves using a solvent or solvent mixture that causes phase separation into a solvent and a polymer-rich phase at a point between the spinneret and the take-up reel. The resultant fibers were washed to remove the solvent and then hot drawn using a draw ratio of between 2.6:1 and 8:1. Single solvents suggested for us in this method included benzenesulfonamide, caprolactam, and trimethylolpropane. Solvent mixtures included dimethyl sulfoxide/pentaerythritol and water in combination with urea or thiourea.

Various solvents for use in spinning polyvinyl alcohol fibers are taught in U.S. Pat. Nos. 4,698,194 and 4,603,083, which issued to Tanaka et al. on Oct. 6, 1987; U.S. Pat. Nos. 4,713,290 and 4,599,267, which issued to Kwon et al. on Dec. 15, 1987; and U.S. Pat No. 4,765,937, which issued to Hyon et al. on Aug. 23, 1988.

The Tanaka et al. patents disclose fibers with tenacities greater than 18 grams per denier prepared from solutions of high molecular weight polyvinyl alcohol exhibiting a degree of polymerization of at least 1500 in organic liquids such as dimethyl sulfoxide, glycerin, ethylene glycol, diethylene triamine, ethylene diamine, phenol and aqueous solutions of inorganic salts such as zinc chloride, sodium thioxyanate, calcium chloride, and aluminum chloride. Dimethyl sulfoxide is the preferred solvent. The fibers cannot be spun using the wet-or dry-spinning method that are conventionally used for polyvinyl alcohol fibers, but rather must be prepared using a unique "dry-jet wet spinning" process described in the patent.

The Kwon et al. patents describe fibers with tenacity values greater than 10 grams per denier prepared from solutions comprising from 2 to 15 percent by weight of an ultra-high molecular weight polyvinyl alcohol exhibiting a molecular weight of at least 50,000 (equivalent to a degree of polymerization of at least 1100), preferably between 1,500,000 and 2,500,000, and a solvent.

Suitable solvents have vapor pressures of at least four-fifths of an atmosphere (80 kPa) at 180 degrees C., and include aliphatic and aromatic alcohols of the desired nonvolatility, water and aqueous solutions of salts such as lithium chloride, calcium chloride or "other materials capable of disrupting hydrogen bonds and thereby increasing the solubility of the polymer".

Fibers are formed by extruding a heated polymer solution through at least one orifice and cooling it sufficiently rapidly to form a gel fiber, extracting the solvent used to initially dissolve the polymer with a volatile second solvent, and subsequently drying the fiber to form a "xerogel". The fiber is drawn in one or two stages at any point during or following cooling of the initially extruded fiber.

The Hyon patent discloses polyvinyl alcohol fibers with tenacity values greater than 15 grams per denier. The degree of polymerization of the polymer used to prepare the fibers is preferably greater than 1700, and the polymer is dissolved in a mixture of water and a water-miscible organic solvent. Suitable organic solvents are disclosed in the aforementioned patent to Hyon et al. directed to polyvinyl alcohol gels. Any of the conventional wet- or dry spinning methods can be used to form the fiber.

The fiber is coagulated at a temperature preferably below −20 degrees C. After being dried the fiber is drawn at a temperature of from 140 to 220 degrees C. in air, an inert gas, silicone oil or polyethylene glycol using a draw ratio of from 20 to 200.

The use of boric acid or borate salts as crosslinking agents for polyvinyl alcohol fibers is taught in U.S. Pat. No. 4,612,157. The purpose of the external crosslinking agent is to improve the physical properties of the final fiber. The fibers are prepared by extruding the polymer solution into an alkaline coagulating bath.

The present inventors discovered that by replacing the aqueous solvents of the prior art with mixtures of dimethyl sulfoxide and certain monohydric aliphatic alcohols in proportions specified hereinafter the resultant solutions can be processed to yield useful products, including hydrogels and fibers. The hydrogels exhibit superior properties relative to products prepared using aqueous solutions of polyvinyl alcohol of comparable molecular weight.

SUMMARY OF THE INVENTION

A solution of polyvinyl alcohol in a non-aqueous mixture of dimethyl sulfoxide and from 10 to about 30 percent, based on the weight of said mixture, of an alcohol containing from 1 to about 4 carbon atoms can be converted to useful articles, including hydrogels and fibers, using prior art methods.

DETAILED DESCRIPTION OF THE INVENTION

This invention provides a novel composition comprising a solubilized polyvinyl alcohol and a mixture of non-aqueous liquids consisting essentially of (1) dimethyl sulfoxide and (2) from 10 to 30 percent, based on the weight of said mixture, of a monohydric alcohol containing from 1 to 4 carbon atoms.

This invention also provides hydrogels obtained by cooling composition of this invention containing from about 5 to about 50 weight percent of polyvinyl alcohol to temperatures not higher than −10 degrees C. for a period of time sufficient to form a gel and then displacing the initial mixture of non-aqueous liquids with water. Data in the accompanying examples demonstrate that prior art non-aqueous solvents such as ethylene glycol cannot be substituted for dimethyl sulfoxide in the present compositions.

Fibers can be prepared by extruding a polyvinyl alcohol composition of this invention containing from 2 to 30 weight percent of polyvinyl alcohol into a cooled coagulating bath containing a non-solvent for the polymer, drying the fiber and then drawing it in a heated medium using a draw ratio of at least about 6.0.

The characterizing feature of this invention resides in using mixtures of dimethyl sulfoxide, which is a solvent for polyvinyl alcohol, and at least one aliphatic alcohol containing from 1 to about 4 carbon atoms, which are non-solvents for the polymer. The alcohol constitutes from 10 to 30 weight percent of the solvent, preferably from 15 to 25 weight percent.

Alcohol concentrations greater than about 40 weight percent typically result in precipitation of the polymer from the solution. The accompanying examples demonstrate a reduction in physical properties of hydrogels prepared from solutions wherein the alcohol constitutes 40 weight percent of the solvent.

Polyvinyl alcohol is typically prepared by hydrolysis or saponification of polyvinyl acetate. The degree of hydrolysis varies depending upon the intended end use of the polymer. The vinyl alcohol polymers of this invention are preferably fully hydrolyzed and are linear or contain at most a minimal degree of branching. The reason for this preference is to achieve the maximum degree of hydrogen bonding. Polyvinyl alcohol is typically not crosslinked by chemical means using reactants that form covalent bonds. The formation of hydrogen bonding between hydroxyl groups on adjacent polymer molecules and crystallization of the polymer are considered responsible for the development of the excellent physical properties associated with the cured polymer.

The molecular weight of the polyvinyl alcohol used to prepare the present composition is determined by the end used of the polymer. Regardless of the intended end use, the polyvinyl alcohol should have a molecular weight of not less than 44,000 preferably not less than 75,000. Commercially available polymers with molecular weights of from 75,000 to 440,000 are preferred for preparing hydrogels, particularly those polymers containing relatively large concentrations of syndiotactic or isotactic segments within the polymer molecules. Because the tensile properties of polyvinyl alcohol fibers are typically directly proportional to the molecular weight of the polymer, it is preferred to use the highest available molecular weight polymer when the objective is to maximize the physical properties of the final fiber.

The concentration of polyvinyl alcohol in the present solutions is also dependent upon the desired end use application of the composition. Concentrations as low as 2 percent by weight or leas are useful for preparing high tenacity fibers by extruding the polymer solution into a chilled coagulation bath containing a non-solvent for the polymer. Hydrogels are typically prepared from solutions containing from about 5 to about 50 percent by weight of polyvinyl alcohol.

The preferred concentration range will depend upon the molecular weight of the polymer and the desired properties of the hydrogel or fiber. Typically the properties of hydrogels, particularly tensile strength and elongation at break increase with increasing concentration and/or molecular weight of the polymer.

The present compositions are typically prepared by dissolving the polyvinyl alcohol in dimethyl sulfoxide and then adding the desired amount of alcohol. Solubilization of the polymer is usually facilitated by heating a mixture of the polymer and dimethyl sulfoxide to temperatures from 50 degrees C. up to the boiling point of the solvent mixture and stirring until the polymer is completely dissolved. Heating is preferably done under an atmosphere of nitrogen or other inert gas to minimize degradation of the polyvinyl alcohol. The alcohol is then added gradually to avoid precipitating the polymer.

Preparation of Hydrogels

One aspect of this invention pertains to hydrogels obtained from the present composition. The hydrogels are prepared using known methods, the difference being in the physical properties of the present hydrogels relative to the properties of similar hydrogels prepared using the aqueous polymer solutions disclosed in the prior art.

In accordance with the present invention, a solution containing from 5 to about 50 weight percent of polyvinyl alcohol in a non-aqueous solvent mixture of this invention is prepared and then cooled to a temperature of at least −10 degrees, preferably at least −20 degrees C., for period of time sufficient to form a crystalline gel structure. This time period depends upon a number of variables, including the concentration and molecular weight of the polymer, the rate at which the solution is cooled, and the rate at which the resultant gel is returned to ambient temperature. Taking all of these variables into account, the time period during which the solution is cooled is generally from 2 to 16 hours.

The present inventors found that for the types and concentrations of polymers and the range of processing conditions they evaluated no significant additional improvement in properties of the final hydrogel was apparent after 16 hours of cooling.

The crystalline gel prepared by cooling a composition of this invention is converted to a hydrogel by replacing the organic solvents with water. Rather than being placed directly into water, the temperature of the gel is raised from the temperature at which it was formed to about 5 degrees C. and maintained for from 1 to 3 hours, at which time the gel is allowed to warm to ambient temperature and placed in methanol or other low molecular weight, water miscible alcohol that is a nonsolvent for the polyvinyl alcohol (PVA) gel. The alcohol is believed to be a more effective extractant for dimethyl sulfoxide than water, thereby considerably shortening the time required to replace all of the dimethylsulfoxide in the gel relative to prior art methods.

The time required to extract the dimethyl sulfoxidealcohol mixture from the gel in an alcohol bath can vary from several minutes to several days. This time interval is dependent upon the surface to volume ratio of the particular sample. When this exchange has been completed the gel is removed from the alcohol bath and placed in a water bath to replace the alcohol with water. The use of a circulating water maintained at a temperature of from just above freezing to about 60 degrees C. is preferred.

The water content of the final hydrogel can range from 20 to about 98 weight percent. The preferred range is determined by the end use application of the gel. Methods for preparing hydrogels having high solids content are known in the art.

Numerous applications of PVA hydrogels are disclosed in the prior art, and include fabrication into films, tubing, fibers, contact lenses and other bio-compatible medical prostheses. PVA hydrogels can also be used as vehicles for the controlled release of various materials, including drugs and other medicaments, air fresheners, perfumes, and biologically active materials and as a medium into which is dispersed a soap or other type of detergent.

Polyvinyl Alcohol Fibers

The present compositions can be converted into fibers using conventional spinning and drawing methods taught in the prior art, including the aforementioned U.S. Pat. No. 4,765,967 to Hyon et al.

The compositions of this invention that are converted into fibers typically contain from 2 to about 30 percent by weight of a polyvinyl alcohol exhibiting a molecular weight of at least 66,000. As discussed hereinbefore, the highest possible molecular weight polymers are desirable when the objective is to maximize tensile properties of the final fiber. The lowest concentration value for a given molecular weight polymer is preferred, based on the ability of these compositions to form fibers exhibiting diameters of 50 microns or less following drawing. These small diameter fibers are desirable based on their uniformity and excellent tensile properties. Most preferably the concentration of polymer in the spinning solution is from 2 to about 10 weight percent.

The polymer solutions of this invention can be spun into fibers using any of the methods taught in the prior art, including wet and dry spinning. The temperature of the liquid or gas into which the spinning solution is extruded and coagulated can range from just above the freezing point of a liquid coagulating bath the ambient or higher for a gaseous coagulating medium.

If wet spinning is used, the polymer solutions of this invention is extruded into a coagulating bath maintaining at a temperature of less than about −10 degrees C., preferably less than −50 degrees C. The coagulating bath contains at least one liquid that is a non-solvent for the polyvinyl alcohol. This liquid is preferably a primary monohydric alcohol containing from 1 to 4 carbon atoms, and is used in combination with solid carbon dioxide to form a eutectic mixture having a temperature of below about −50 degrees C.

The present inventors found it desirable to use a series of coagulation baths of increasing temperature. The final bath is at ambient temperature. Preferably this temperature increase occurs in three stages, the first bath being at a temperature of about −70 degrees C., the second at about −20 degrees and the third at ambient temperature.

The coagulated fiber is collected using a spool or other similar take-up device and is first dried and then drawn to develop the desired level of tensile properties. As in the case of the gel, to expedite the drying procedure the present inventors found it desirable to first extract the dimethyl sulfoxide-alcohol solvent with a water-soluble alcohol such as methanol.

The fiber can be dried using any of the methods described in the prior art. The time required to dry the fiber can be shortened using heat alone or in combination with reduced pressure to accelerate evaporation of the solvent(s).

The dried fibers can then drawn using the highest possible draw ratio to achieve maximum orientation of the crystalline structure of the polymer. This orientation appears to be a requirement for optimization of physical properties. The present fibers are preferably drawn in a liquid medium that is a non-solvent for the polymer and which is heated to temperatures of from 80° to about 230° C. This temperature range is preferably from about 140° to about 210° C. Liquid polydiorganosiloxanes, typically polydimethylsiloxanes and polyphenylmethylsiloxanes, also referred to as silicone oils, are preferred liquid media due to their thermal stability and chemical inertness with respect to polyvinyl alcohol.

When it is desired to employ draw ratios greater than about 10 this is preferably accomplished using a two-stage drawing process. In the first stage the draw ratio is up to about 10 and the temperature is up to about 150° C. to avoid melting the fiber. The crystallization that occurs during the first drawing stage raises the melting point of the fiber from 226 up to about 235, permitting use of higher drawing temperatures in the second stage. During this second drawing stage the draw ratio is typically from 1.1 to about 2, resulting in maximum orientation and optimization of fiber properties. The diameter of fibers prepared using a two-stage drawing process typically range from 40 to 100 microns.

In accordance with a preferred two-stage drawing method the first stage employs draw bath exhibiting a temperature profile such that the temperature gradually increases from about 135° C. at the entry point of the fiber, reaches a maximum of about 145° C. at the midpoint of the bath and gradually decreases from this point to about 140° C. at the point were the fiber exist from the bath. The temperature of the draw bath used in the second stage increases from 180 degrees C. at the entry point to 205 degrees C. at the midpoint.

Irrespective of the medium in which the fiber is drawn, drawing is most readily accomplished using a fiber take-up roll that rotates at a higher surface speed relative to the supply roll. The path traveled by the fiber between these two rolls takes it through the draw bath of other drawing medium.

The following examples are intended to describe preferred embodiments of the present invention and should not be interpreted as limiting the scope of the invention defined in the accompanying claims. Unless otherwise indicated all parts and percentages specified in the examples are by weight and viscosities were measured at 25 degrees C.

Example 1

This example demonstrates the superior physical properties of polyvinyl alcohol gels prepared using compositions of this invention relative to gels prepared using an identical polymer dissolved in other liquids or mixtures of dimethyl sulfoxide and a lower aliphatic alcohol where the concentration of alcohol is outside of the present limits.

Ten percent by weight solutions of a polyvinyl alcohol exhibiting a number average molecular weight of 86,000 were prepared by dissolving the polymer in each of the solvents specified in the accompanying Table 1. The solvents included water, dimethyl sulfoxide (DMSO), and mixtures of dimethyl sulfoxide with water, methanol, ethanol, n-propanol, iso-propanol, or n-butanol. The initial mixture of polymer and solvent(s) was heated at a temperature of 100 degrees C. for 30 minutes to completely dissolve the polymer.

The resultant polymer solution was then poured into a petri dish and stored for 16 hours in the freezer compartment of a refrigerator maintained at a temperature of −22 degrees C. The resultant gel was removed from the refrigerator and placed in a container of methanol for 24 hours to replace the initial solvent. The gel was then placed in a room temperature water bath for 2 days to achieve substantially complete replacement of the methanol with water.

The light transmittance and haze values of the resultant hydrogels were determined using Hunter Hazemeter (Model DSSH, manufactured by Hunter Associates Laboratories, Fairfax, Va.). The tensile strength and elongation were determined using an Instron Model 1122 tensionometer. The values for these properties are reported in Table 2 together with the solids content of the final gel.

Sample numbers followed by the letter C identify controls that were prepared for comparative purposes. These samples are outside the limits of this invention.

Table 1

| Sample No. | Co-solvent ROH; R= | ROH/DMSO (parts) | Sample Thickness (mm) |
|---|---|---|---|
| 1C | None | 0/90 | 2.42 |
| 2C | H | 90/0 | 1.83 |
| 3 | CH₃ | 9/81 | 1.84 |
| 4 | " | 18/72 | 2.0 |
| 5 | " | 22.5/67.5 | 1.9 |
| 6C | " | 36/54 | 2.0 |
| 7 | n-C₄H₉ | 9/81 | 1.8 |
| 8 | " | 18/72 | 1.9 |
| 9 | " | 22.5./26.5 | 1.8 |
| 10C | " | 36/54 | 1.7 |
| 11 | n-C₃H₇ | 9/81 | 1.8 |
| 12 | " | 18/72 | 1.9 |
| 13C | " | 22.5/67.5 | 1.9 |
| 14C | " | 36/54 | 1.9 |
| 15 | C₂H₅ | 9/81 | 1.9 |
| 16 | " | 18/72 | 1.9 |
| 17 | " | 22.5/67.5 | 1.9 |
| 18C | " | 36/54 | 1.9 |
| 19 | i-C₃H₇ | 9/81 | 1.8 |
| 20 | " | 18/72 | 2.0 |
| 21 | " | 22.5/67.5 | 1.8 |
| 22C | H | 9/81 | 1.9 |
| 23C | " | 18/72 | 2.0 |
| 24C | " | 22.5/67.5 | 1.9 |
| 25C | " | 36/54 | 1.8 |
| 26C | " | 45/45 | 1.8 |

Table 2

| Sample No. | Trans. (%) | Haze (%) | Tensile (mPa) | Elongation (%) | Solids (%) |
|---|---|---|---|---|---|
| 1C | 26.5 | 104.3 | 0.15 | 80 | 22.58 |
| 2C | 68.9 | 63.6 | 0.13 | 35 | 5.19 |
| 3 | 9.3 | 84.5 | 2.41 | 459 | 24.36 |
| 4 | 75.2 | 77.8 | 2.10 | 462 | 24.99 |
| 5 | 93.7 | 14.2 | 1.25 | 465 | 23.68 |
| 6C | 54.4 | 100.3 | 0.22 | 299 | 11.79 |
| 7 | 53.5 | 88.5 | 0.62 | 177 | 24.39 |
| 8 | 89.3 | 26.8 | 1.47 | 440 | 24.08 |
| 9 | 89.9 | 23.1 | 1.47 | 497 | 23.55 |
| 10C | 47.7 | 100.6 | 0.14 | 109 | 11.25 |
| 11 | 60.8 | 99.8 | 1.46 | 358 | 24.29 |
| 12 | 66.6 | 74.0 | 2.18 | 504 | 24.01 |
| 13 | 90.6 | 10.2 | 1.75 | 498 | 23.08 |
| 14C | 51.3 | 101.3 | 0.18 | 211 | 12.42 |
| 15 | 65.6 | 88.4 | 0.67 | 264 | 23.91 |
| 16 | 88.8 | 53.4 | 1.73 | 482 | 24.50 |
| 17 | 90.2 | 30.3 | 1.73 | 453 | 22.90 |
| 18C | 48.5 | 94.5 | 0.10 | 163 | 13.27 |
| 19 | 80.0 | 53.4 | 0.63 | 283 | 21.68 |
| 20 | 93.3 | 43.7 | 1.19 | 427 | 23.76 |
| 21 | 98.0 | 32.8 | 1.66 | 508 | N.D. |
| 22C | 59.8 | 84.3 | 1.09 | 423 | 22.26 |
| 23C | 94.7 | 7.5 | 1.37 | 466 | 24.93 |
| 24C | 94.3 | 7.2 | 1.04 | 444 | 22.63 |
| 25C | 91.8 | 7.3 | 0.78 | 438 | 17.99 |
| 26C | 92.0 | 15.5 | 0.99 | 479 | 18.51 |

N.D. = Not Determined

These data demonstrate lower tensile strength for hydrogels prepared in solvents containing 40 weight percent of methanol, ethanol, n-propanol or iso-propanol relative to gels prepared in solvents containing 10, 20 or 25 weight percent of these alcohols.

For purposes of comparison a hydrogel was prepared by replacing the dimethyl sulfoxide portion of a dimethyl sulfoxide/ethanol mixture described in the preceding section of this example with an equal weight of ethylene glycol. The weight ratio of ethylene glycol to ethanol was 4:1, respectively and the concentration of polyvinyl alcohol in the final composition was 10 percent by weight. A clear solution was prepared by heating a mixture of the polyvinyl alcohol and ethylene glycol to 133 degrees C. The solution was then cooled to about 110 degrees C., at which time the solution became very viscous. The ethanol was then added dropwise, resulting in gelation of the polymer. The opaque gel was weak and soft. This gel was placed in the freezer section of a refrigerator for about 16 hours, and which time it was observed to not have changed appreciably in appearance or properties from the initial gel.

Example 2

This example describes the preparation of fibers from a polyvinyl alcohol composition of this invention.

Eight parts of a polyvinyl alcohol exhibiting a molecular weight of 86,000 and a degree of saponification greater than 99.8% was combined with 73.6 parts of dimethylsulfoxide (DMSO) and heated under a nitrogen atmosphere at 110° C. for 30 minutes, at which time 18.4 parts of n-propanol were gradually added with stirring to avoid precipitating the polymer. The resultant clear solution was then cooled to 82° C. and maintained at this temperature until it was spun into a fiber by extruding it through a #16 hypodermic needle (orifice diameter=0.5 mm) into a three stage coagulation bath. The first stage contacted by the fiber was 25 cm. in length and consisted essentially of a mixture of n- propanol and solid carbon dioxide (−70° C.), the second stage bath was 50 cm. in length and contained n-propanol maintained at a temperature of −20° C., and the final stage was 100 cm. in length and contained n-propanol maintained at ambient temperature. The speed of the fiber was about 3000 cm. per minute. The fiber was collected on a take-up roll that was subsequently placed in a container of methanol for 24 hours.

The fiber was dried by placing the take-up roll bearing the fiber in a vacuum oven for one hour under a pressure of 63 cm. of mercury. The temperature within the oven was maintained at ambient or 60° C.

The extracted and dried fiber was then drawn by in two stages by passing it through a 105 cm.-long tubular silicone oil bath. The silicone oil was a dimethylsiloxane/methylphenylsiloxane copolymer. The temperature profile within the bath used for the first drawing stage was such that the temperature gradually increased from 138° C. at the point of entry of the fiber to 145° C. at the midpoint of the bath and then decreased to 140° C. at the point of exit of the fiber. The difference between the surface speeds of the supply and take-up rolls for the various samples prepared was equivalent to a draw ratio of from 20.8.

The temperature at the entrance point of the bath used for the second stage draw was 180 degrees C. and 205 degrees C. at the midpoint. The additional drawing during this stage was equivalent to a total draw ratio of 33.4.

The drawn fiber exhibited a tensile strength of 16.1 grams per denier and a tensile modulus of 330 grams per denier. The melting temperature and heat of fusion were 228 degrees C. and 118.7 joules/gram, respectively, and were determined using a differential scanning calorimeter programmed to provide a temperature increase of 10° C./minute.

That what is claimed is:

1. In a method for preparing polyvinyl alcohol fibers comprising the following series of steps:
    (1) preparing a solution containing from 2 to 30 weight percent of polyvinyl alcohol exhibiting a molecular weight of at least 66,000 in a solvent mixture comprised at least in part of an organic liquid,
    (2) extruding the resultant solution into a bath maintained at a temperature no higher than −20 degrees C. to coagulate said polyvinyl alcohol in the form of a fiber,
    (3) drying said fiber and
    (4) drawing said fiber in a heated gaseous or liquid medium, the improvement comprising preparing said solution in a nonaqueous solvent mixture consisting essentially of dimethyl sulfoxide and from 10 to 30 percent, based on the weight of said mixture, of a monohydric alcohol containing from 1 to 4 carbon atoms, extruding said fiber into a bath consisting essentially of a monohydric alcohol containing from 1 to 4 carbon atoms, and drawing said fiber using a draw ratio greater than about 20 .

2. A method according to claim 1, where the concentration of polyvinyl alcohol is from 2 to 10 percent by weight, said alcohol is ethanol, n-propanol or iso-propanol, the bath used to coagulate the fiber is a multistage bath wherein the coagulating liquid is an alcohol containing from 1 to 4 carbon atoms, and the fiber is drawn in a liquid maintained at a temperature of from 80 to 230 degrees C.

3. A method according to claim 2 where the fiber is drawn using a two-stage drawing process in a silicone oil maintained at a temperature of 145 degrees for the first stage and a temperature of 205 degrees for the second stage, and the diameter of the final fiber does not exceed 50 microns.

* * * * *